(12) United States Patent
Kersey et al.

(10) Patent No.: US 8,073,293 B2
(45) Date of Patent: Dec. 6, 2011

(54) SENSING DEVICE HAVING A LARGE DIAMETER D-SHAPED OPTICAL WAVEGUIDE

(75) Inventors: Alan D. Kersey, South Glastonbury, CT (US); Paul E. Sanders, Madison, CT (US); Martin A. Putnam, Cheshire, CT (US); Edward Michael Dowd, Madison, CT (US)

(73) Assignee: Weatherford, LAMB, Inc., Houston, TX (US)

( * ) Notice: Subject to any disclaimer, the term of this patent is extended or adjusted under 35 U.S.C. 154(b) by 437 days.

(21) Appl. No.: 10/756,183

(22) Filed: Jan. 13, 2004

(65) Prior Publication Data
US 2004/0179765 A1    Sep. 16, 2004

Related U.S. Application Data

(63) Continuation-in-part of application No. 10/098,891, filed on Mar. 18, 2002, now Pat. No. 6,996,316.

(60) Provisional application No. 60/439,716, filed on Jan. 13, 2003.

(51) Int. Cl.
*G02B 6/00* (2006.01)
*G02B 6/02* (2006.01)

(52) U.S. Cl. .......................... 385/12; 385/123

(58) Field of Classification Search .................. 385/126, 385/12, 123
See application file for complete search history.

(56) References Cited

U.S. PATENT DOCUMENTS

| | | | |
|---|---|---|---|
| 4,386,822 A * | 6/1983 | Bergh | 385/11 |
| 4,387,954 A * | 6/1983 | Beasley | 385/30 |
| 4,488,040 A * | 12/1984 | Rowe | 250/227.14 |
| 5,103,492 A | 4/1992 | Ticknor | |
| 5,623,561 A * | 4/1997 | Hartman | 385/12 |
| 5,647,030 A * | 7/1997 | Jorgenson et al. | 385/12 |
| 5,680,489 A | 10/1997 | Kersey | |
| 6,194,120 B1 * | 2/2001 | Chan et al. | 430/270.1 |
| 2002/0041724 A1 * | 4/2002 | Ronnekleiv et al. | 385/12 |
| 2002/0172459 A1 | 11/2002 | Bailey et al. | |
| 2002/0197037 A1 * | 12/2002 | Bailey et al. | 385/123 |

FOREIGN PATENT DOCUMENTS

| | | |
|---|---|---|
| CA | 1 248 383 | 1/1989 |
| EP | 0 127 257 | 12/1984 |
| JP | 61117411 | 6/1986 |
| WO | WO 02/075404 | 9/2002 |

OTHER PUBLICATIONS

U.K. Search Report, Application No. GB0400487.5, dated Jun. 28, 2004.
Canadian Office Action, Application No. 2,454,970, dated Feb. 25, 2005.

* cited by examiner

*Primary Examiner* — Ryan Lepisto
*Assistant Examiner* — Jerry Blevins
(74) *Attorney, Agent, or Firm* — Patterson & Sheridan, LLP

(57) ABSTRACT

An optical sensor formed from an optical waveguide having at least one core surrounded by a cladding and a large diameter generally D-shaped portion is disclosed. Axial or compressive strain across the D-shaped cross section may be determined by measuring the change in polarization or birefringence of the light output from the sensor. A layer responsive to a parameter may be disposed on a flat portion of the D-shaped portion of the sensor. The refractive index of the layer changes and/or the layer applies a strain on the sensor in response to the parameter. Changes in the refractive index of the layer alters the light output from the sensor, which is measured over time and correlated to the parameter.

6 Claims, 3 Drawing Sheets

SENSING DEVICE HAVING A LARGE DIAMETER D-SHAPED OPTICAL WAVEGUIDE

CROSS-REFERENCE TO RELATED APPLICATIONS

This application claims benefit of U.S. Provisional Patent Application Ser. No. 60/439,716, filed Jan. 13, 2003, which is herein incorporated by reference. This application is a continuation-in-part of U.S. patent application Ser. No. 10/098,891, filed Mar. 18, 2002 now U.S. Pat. No. 6,996,316, which is herein incorporated by reference.

BACKGROUND OF THE INVENTION

1. Field of the Invention

The invention relates to optical sensors. More particularly, the invention relates to optical sensors formed from an optical waveguide with a large outer transverse diameter and a substantially D-shaped portion.

2. Description of the Related Art

Various industries and applications utilize optical sensors to measure parameters such as temperatures, pressures, and chemicals in a particular environment. In particular, optical sensors are finding increased applications in civil, industrial, and military fields where enhanced sensitivity, geometrical flexibility, miniaturization, immunity from electromagnetic interference and multiplexing capabilities are desirable. Optical sensors used to detect environmental parameters often require specialized structures in and around an optical fiber and tools to make the specialized structures. Additionally, some sensors are better suited in certain applications than others based on the size, accuracy, or durability of the sensor in a harsh environment with high temperatures and/or pressures.

Optical fibers having non-circular cross-sectional outer shapes such as D-shapes are used for various purposes including coupling light or the evanescent field into and/or out of the fiber and/or mechanically determining, orienting or aligning the polarization states of a fiber. When a portion of a cladding of an optical fiber is removed to create a D-shaped fiber portion, the fiber becomes fragile due to the small diameter of the cladding, e.g., about 125 microns. The fiber with the D-shape is highly lossy, difficult to manufacture and difficult to use because the fiber is delicate and fragile.

Therefore, there exists a need for an optical sensor that is durable, easy to use and easy to manufacture.

SUMMARY OF THE INVENTION

The invention generally relates to an optical sensor formed from an optical waveguide that permits access to the evanescent field and is easy to use and manufacture. The optical sensor includes an outer cladding having at least one inner core disposed therein that propagates light. A portion of the optical sensor has a generally D-shaped cross-section and a transverse outer waveguide dimension that is greater than about 0.3 mm. The large outer diameter D-shape of the sensor has inherent mechanical rigidity to improve packaging options, reduce bend losses, and resist damage from handling. Further, advantages for grating writing into the sensor in the D-shaped section due to the flat surface include lower power, better optical absorption by the core, and easier alignment. Axial or compressive strain across the D-shaped cross section may be determined by measuring the change in polarization or birefringence of the light output from the sensor. In one embodiment, a layer responsive to a parameter is disposed on a flat portion of the D-shaped portion of the sensor. The refractive index of the layer changes and/or the layer applies a strain on the sensor in response to the parameter. Changes in the refractive index of the layer alters the light output from the sensor, which is measured over time and correlated to the parameter.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 3 is a perspective view of an alternative embodiment of a large D-shaped optical sensor having a responsive layer.

DETAILED DESCRIPTION OF THE PREFERRED EMBODIMENT

Figure 1:
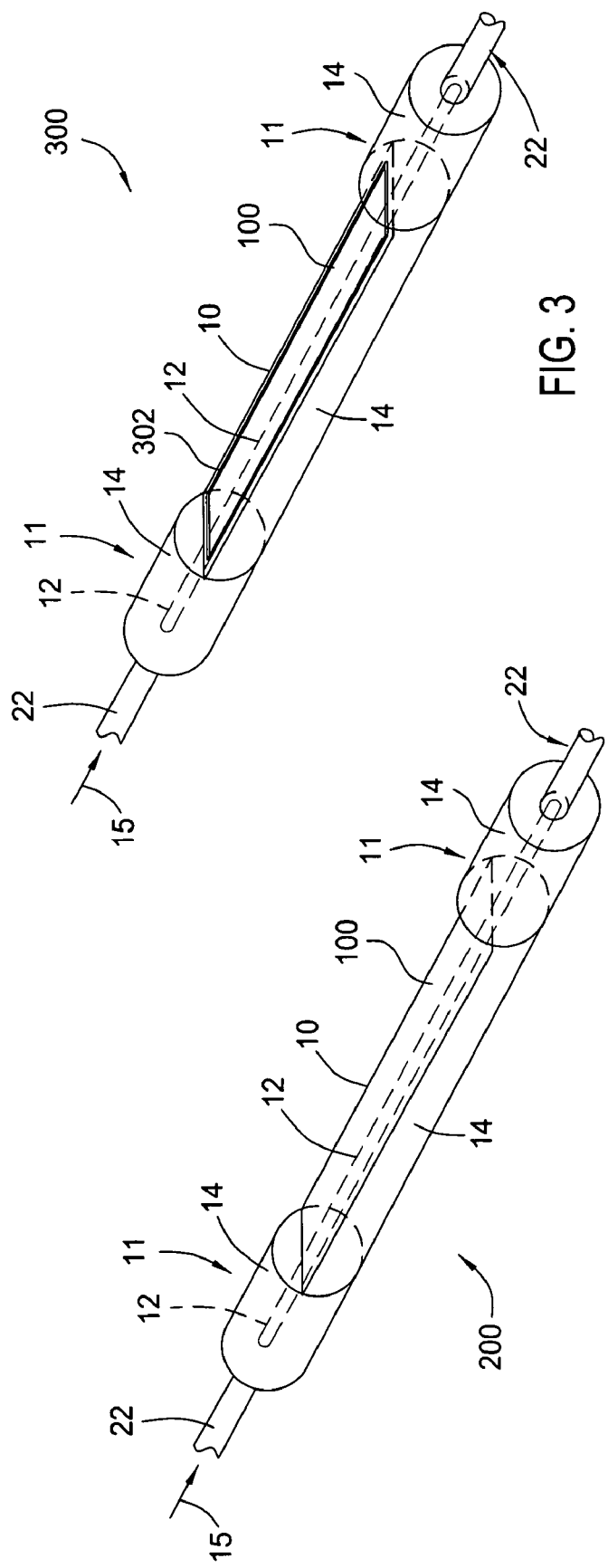
FIG. 1 is a perspective view of a large D-shaped optical sensor.
Figure 2:
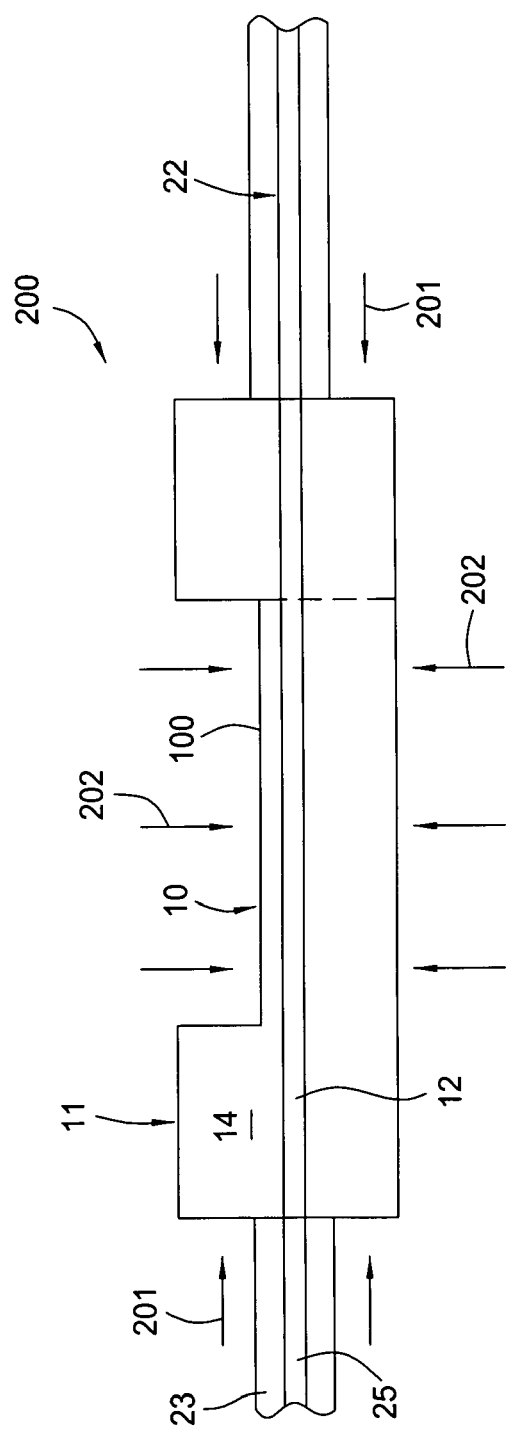
FIG. 2 is a side view of the sensor shown in FIG. 1.

FIGS. 1 and 2 illustrate a large diameter D-shaped optical sensor 200 that is a waveguide with a generally D-shaped portion 10 and at least one core 12 surrounded by a cladding 14. Additionally, the shape of the waveguide forming the sensor 200 may include one or more circular portions 11. The sensor 200 comprises silica glass ($SiO_2$) based material having the appropriate dopants to allow light 15 to propagate in either direction along the core 12 and/or within the sensor 200. Other materials for the sensor 200 may be used such as any glass material, e.g., silica, phosphate glass, other glasses, or solely plastic. Further, the sensor 200 may be a birefringent, polarization maintaining, polarizing, multi-core, or multi-cladding optical waveguide. The cladding 14 has an outer dimension of at least about 0.3 millimeters and the core 12 has an outer dimension such that it propagates the desired number of spatial modes. Thus, the outer dimension of the cladding 14 of the sensor 200 is larger than an outer dimension of a fiber, which is approximately 125 micrometers.

The D-shaped portion 10 of the sensor 200 has a flat surface 100 and a rounded outer surface. The flat surface 100 may be formed by removing a portion of the cladding 14 and, optionally, the core 12 from the circular portions 11. In this manner, the flat surface 100 of the D-shaped portion 10 may be formed by micro machining, grinding, polishing, etching or otherwise forming the flat surface 100 in the sensor 200 using any suitable known or unknown techniques. The face of the flat surface 100 may be further polished or fire polished or otherwise treated to enhance optical characteristics. Alternatively, any portion of the sensor 200 may be formed by glass collapsing and fusing of an outer sleeve or tube to an optical fiber.

Incoming light 15 may be launched into the sensor 200 and/or the core 12 by splicing a suitable standard optical fiber 22 having a cladding 23 and a core 25 to one or both axial ends of either the circular portion 11 of the sensor 200 or the D-shaped portion 10 of the sensor 200 using any known techniques for splicing fibers or coupling light from an optical fiber into a larger waveguide. The large diameter "cane" circular waveguide portion 11 provides an optical interface that allows easy axial coupling or pig tailing of the optical fiber 22 to the D-shaped waveguide portion 10. The circular portion 11 may not be required if the distance of the large diameter D-shaped waveguide portion 10 provides sufficient space for the fiber 22 to be attached. Other variations of the large diameter D-shaped optical sensors disclosed herein may be used such as any of the variations of the D-shaped optical waveguides disclosed in U.S. patent application Ser. No. 10/098,891, which is hereby incorporated by reference in its entirety.

As shown in FIG. 2, the large diameter D-shaped optical sensor 200 detects and measures an axial strain 201 and/or cross axis strain 202 (e.g., compressive strain). In response to the axial strain 201 or the cross axis strain 202, the sensor 200 creates or changes the polarization or the birefringence of the light 15 passing through the sensor 200 to provide an optical signal indicative of the strain on the sensor 200. The change in the polarization or the birefringence is due to the unequal transverse strain on the sensor 200. The strain 201, 202 on the sensor 200 may be a result of a thermal change, pressure change or mechanical change (e.g., position). Known apparatus and methods detect and measure the change in the polarization or the birefringence of the light that passes through the sensor 200 and provide a signal indicative of the strain 201, 202.

Figure 4:
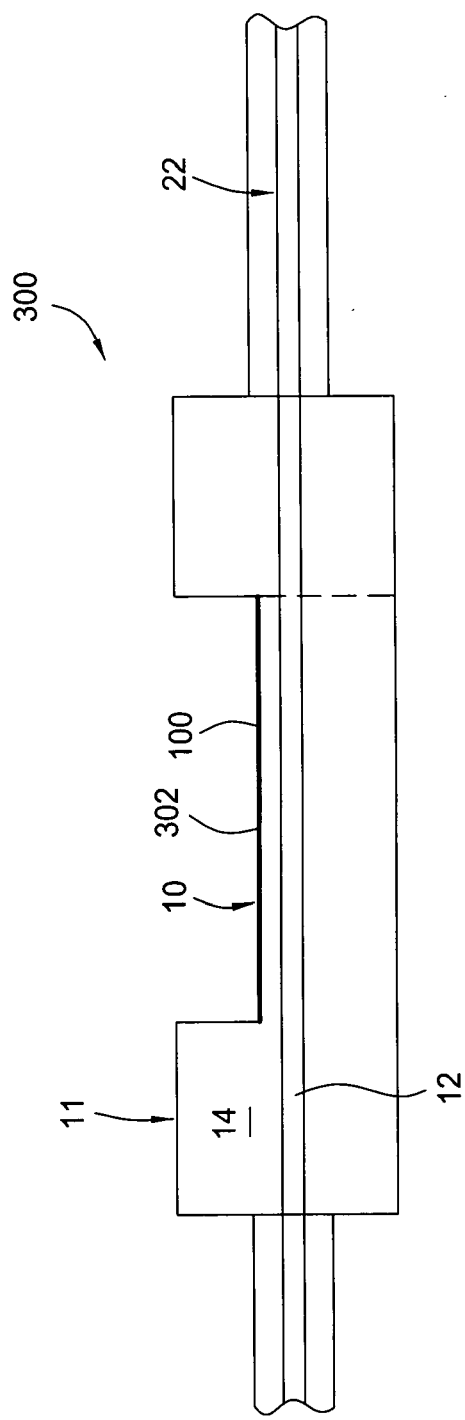
FIG. 4 is a side view of the sensor shown in FIG. 3.

FIGS. 3 and 4 illustrate an alternative embodiment of a large diameter D-shaped optical sensor 300 that has a responsive layer of material or coating 302 that is sensitive to certain desired measurands (e.g., hydrogen, magnetic fields, electric fields, humidity, other chemicals, temperature and/or photonics). Since the structure of the sensor 300 shown in FIGS. 3 and 4 is similar to the sensor 200 illustrated in FIG. 2, corresponding features are identified by like reference numbers. In one embodiment, the coating 302 is a polymer or a crystal material applied to the D-shaped portion 10 of the sensor 300. Thus, the coating 302 becomes part of the cladding 14 of the sensor 300. The coating 302 changes the refractive index or other optical parameters of the sensor 300 and/or introduces a strain on the sensor 300 in response to the measured. As discussed above, the strain creates or changes the polarization or the birefringence of the light 15 passing through the sensor 300 in order to allow detection and measurement of the strain that is indicative of the measured. The change in the refractive index of the coating 302 occurs with changes in temperature, application of an electric field, an infusion of a chemical compound, changes in pressure and/or any other change in environmental conditions in relation to the measured of interest. Changes in the refractive index of the coating 302 affect the propagation of the light 15 within the sensor 300. As discussed in more detail below, the changes in the affected propagation of the light 15 may be measured to provide a signal indicative of the measured.

The refractive index of the coating 302 changes with temperature for the most part proportionally with changes in the density of the coating 302 caused by an increase in volume of a polymer making up the coating 302. The refractive index increases due to a decrease in volume as the coating 302 cools, and the refractive index decreases due to an increase in volume as the coating 302 heats up. The change in refractive index of the coating 302 based on changes in temperature can be used in two ways. The coating 302 may have a refractive index slightly higher than the cladding 14 at room temperature (approximately 24° C.) such that the coating 302 acts as a mode stripper at room temperature and effectively strips any light 15 from the sensor 300 that reaches the coating 302. As the temperature increases and the refractive index of the coating 302 decreases to the refractive index of the cladding 14, the coating 302 acts as cladding and reflects the light into the senor 300. Examples of polymers with this refractive index characteristic that can be used as the coating 302 include copolymers of polydimethyldiphenysiloxane. Alternatively, the polymer coating 302 may be made from a polymer having a lower refractive index than the refractive index of the cladding 14 at room temperature. Thus, the light transmits through the sensor 300 at room temperature but not at lower temperatures. Polymers meeting these criteria for refractive index include polydimethylsiloxane and highly fluorinated hydrocarbons such as polyperfluorocyclohexylacrylate. Thus, measuring the changes in total optical light output or intensity that is either transmitted directly through the sensor 300 or reflected back provides a quantitative and qualitative indication of the temperature of the coating 302 and hence the temperature of the environment surrounding the coating 302. The two examples provided merely illustrate the use of particular polymers as the coating 302 to enable the determination of an increase or decrease in temperature from a given temperature such as room temperature and are not intended to be limiting.

A poled polymer or a polable crystal material provides a change in the refractive index of the polymer or the material based upon the influence of an applied electric field. Thus, the coating 302 may be made from the poled polymer or the potable crystal material to enable the sensor 300 to detect an electric field in a similar manner as described above with respect to measuring changes in temperature due to changes in the refractive index of the coating 302. Isotactic polyvinylidenefluoride provides an example of a poled polymer for use as the coating 302 that changes refractive index under an electric field.

Certain polymers increase in volume or swell when exposed to a specific chemical or chemical compound, thereby decreasing the refractive index of the polymer. Thus, the coating 302 may be made from a polymer that swells when a specific chemical infuses into the polymer enabling the sensor 300 to detect the chemical in a similar manner as described above with respect to measuring changes in temperature due to changes in the refractive index of the coating 302. The change in refractive index of the polymer depends on the difference between the refractive index of the chemical and the refractive index of the polymer used as the coating 302 and the concentration of the chemical within the polymer. Polydimethyldiphenysiloxane, polydimethylsiloxane and highly fluorinated hydrocarbons such as polyperfluorocyclohexylacrylate provide examples of polymers for use as the coating 302 that change refractive index when exposed to specific chemicals or chemical compounds.

Figure 5:
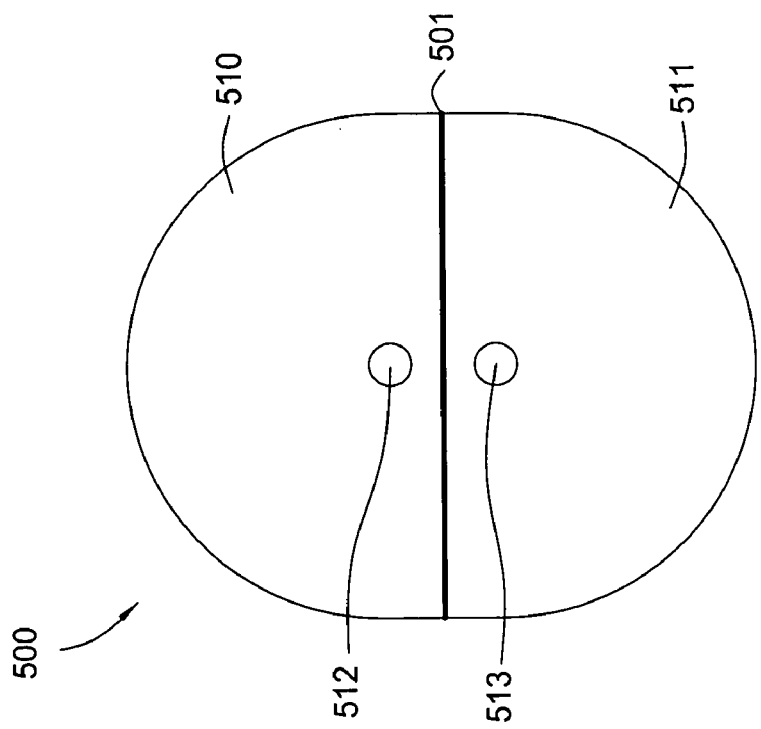
FIG. 5 is a cross-sectional view of an alternative embodiment of a sensor that includes a responsive layer between two large D-shaped optical waveguides.

FIGS. 5 illustrates an alternative embodiment of an optical sensor 500 that utilizes a responsive layer 501 between a first large D-shaped optical waveguide 510 and a second large D-shaped optical waveguide 511. Each of the large D-shaped optical waveguides 510, 511 have the same basic structure as the D-shaped portion 10 of the sensor 200 shown in FIGS. 1 and 2. The large D-shaped optical waveguides 510, 511 are oriented with the flat surfaces opposing each other and separated by the responsive layer of material or coating 501. Similar to the coating 302 in FIG. 3, the coating 501 expands and contracts in response to a measured such as heat, light, electric field, magnetic field, humidity, chemicals (e.g., hydrogen). Consequently, the expansion and contraction of the coating 501 alters the spacing between cores 512, 513 of the waveguides 510, 511, which in turn alters the characteristics of the light passing through the waveguides 510, 511 in order to provide a signal indicative of the measured that effected the coating 501. For example, a response in the coating 501 (expansion/contraction and/or refractive index) can alter the amount of light coupled between the two cores 512, 513.

Figure 6:
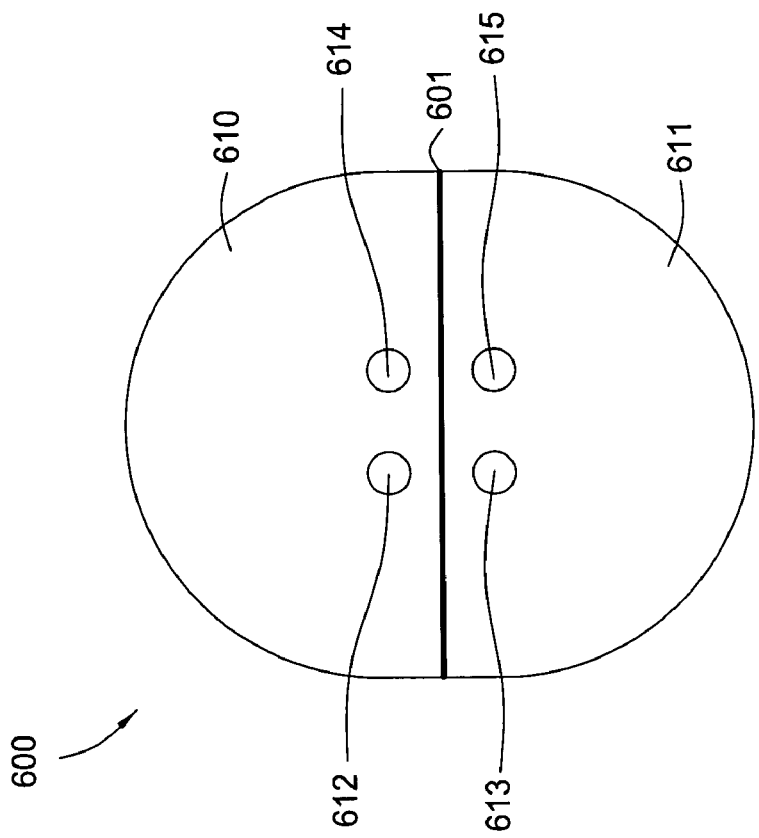
FIG. 6 is a cross-sectional view of an alternative embodiment of a sensor that includes a responsive layer between two large D-shaped optical waveguides with two cores.

FIG. 6 shows an alternative embodiment of an optical sensor 600. Similar to the sensor 500 shown in FIG. 5, the sensor utilizes a responsive layer 601 between a first large D-shaped optical waveguide 610 and a second large D-shaped optical waveguide 611. However, each of the waveguides 610, 611 include two cores 612, 614, 613, 615 to propagate light. Thus, expansion and contraction of the coating 601 in response to a measured alters the spacing between the four cores 612-615 of the waveguides 610, 611 to provide a signal as described in relation to FIG. 5.

While the foregoing is directed to embodiments of the present invention, other and further embodiments of the invention may be devised without departing from the basic scope thereof, and the scope thereof is determined by the claims that follow.

The invention claimed is:

1. An optical sensor for sensing a measurand, comprising:
    an optical waveguide having an outer cladding and at least one inner core disposed therein which propagates light;
    a D-shaped portion of the optical waveguide having a generally D-shaped cross-section, wherein a property of the D-shaped portion changes in response to the measurand, the property being polarization or birefringence; and
    a layer disposed on a flat surface of the D-shaped portion, wherein a refractive index of the layer changes in response to a change in the measurand.

2. The optical sensor of claim 1, wherein the measurand includes at least one of the members of the group consisting of heat, humidity, light, electric field, magnetic field and chemicals.

3. The optical sensor of claim 1, wherein a transverse outer dimension of the waveguide is greater than 0.3 millimeters.

4. An optical sensor for sensing a measurand, comprising:
    a first D-shaped waveguide having a generally D-shaped cross-section;
    a second D-shaped waveguide having a generally D-shaped cross-section, wherein the first and second D-shaped waveguides are optically coupled together and wherein a property of at least one of the first and second D-shaped waveguides changes in response to the measurand, the property being polarization or birefringence; and
    a layer disposed between the first and second D-shaped waveguides, the layer capable of changing thickness in response to the measurand, wherein the measurand includes at least one member of the group consisting of heat, humidity, light, electric field, magnetic field and chemicals.

5. The optical sensor of claim 4, wherein the first D-shaped waveguide has at least one first inner core disposed therein which propagates light in substantially a few spatial modes and the second D-shaped waveguide has at least one second inner core disposed therein which propagates light in substantially a few spatial modes.

6. The optical sensor of claim 4, wherein the first and second D-shaped waveguides include a plurality of cores.

\* \* \* \* \*